United States Patent
Morgan

[19]

[11] Patent Number: 6,062,950
[45] Date of Patent: May 16, 2000

[54] DUAL WHEEL TIRE GRINDER

[75] Inventor: John R. Morgan, Wilson, N.C.

[73] Assignee: Bridgestone/Firestone, Inc., Akron, Ohio

[21] Appl. No.: 09/154,013

[22] Filed: Sep. 16, 1998

[51] Int. Cl.$^7$ ........................................ B24B 5/36
[52] U.S. Cl. ................................. 451/28; 451/254
[58] Field of Search ................... 451/49, 65, 57, 451/67, 246, 254, 258, 456; 241/DIG. 31

[56] References Cited

U.S. PATENT DOCUMENTS

| | | | |
|---|---|---|---|
| 2,535,281 | 12/1950 | Glynn | 51/273 |
| 2,788,851 | 4/1957 | Rawls et al. | 164/10.2 |
| 2,864,445 | 12/1958 | Hawkinson | 164/10.2 |
| 2,965,162 | 12/1960 | Hawkinson | 157/13 |
| 3,455,065 | 7/1969 | Hajime Shiomi et al. | 51/104 |
| 3,866,360 | 2/1975 | Monajjem | 51/281 R |
| 3,882,644 | 5/1975 | Cusumano | 451/456 X |
| 3,932,965 | 1/1976 | Kline, Jr. | 51/281 |
| 3,980,120 | 9/1976 | Fawcett et al. | 157/13 |
| 4,041,647 | 8/1977 | Ugo | 451/254 |
| 4,736,546 | 4/1988 | Ugo | 451/254 |
| 4,967,516 | 11/1990 | Hoshino et al. | 451/456 X |
| 5,099,613 | 3/1992 | Rogers, Jr. | 451/254 X |
| 5,167,215 | 12/1992 | Harding, Jr. | 451/456 X |
| 5,185,960 | 2/1993 | Majerus et al. | 51/104 |
| 5,279,076 | 1/1994 | Healy et al. | 51/273 |

*Primary Examiner*—David A. Scherbel
*Assistant Examiner*—Anthony Ojini
*Attorney, Agent, or Firm*—Fred H. Zollinger, III; John M. Vasuta

[57] ABSTRACT

A tire grinding apparatus includes at least one support arm pivotally connected to a base. A pair of grinding wheels are rotatably carried by the support arm and are adapted to engage the outer surface of a tire. The grinding wheels are disposed such that one of the grinding wheels is a leading grinding wheel and the other is a trailing grinding wheel. The grinding wheels rotate in opposite directions. The grinding wheels are partially disposed in a hood that is in fluid communication with a vacuum source. A source of pressurized air is in fluid communication with a blower head that is disposed between the grinding wheels such that it directs pressurized air against the surface of the tire being ground. The pressurized air removes dust from the tread grooves and sipes of the tire where it is collected by the hood and removed from the hood from the vacuum system. The position of the trailing wheel is adjustable with respect to the leading grinding wheel and the support arm. The position of the support arm is adjustable with respect to the tire. The tire grinding apparatus provides an improved surface finish by utilizing the two grinding wheels and removes a substantial amount of the dust from the tread groves in sipes of the tire.

16 Claims, 5 Drawing Sheets

DUAL WHEEL TIRE GRINDER

BACKGROUND OF THE INVENTION

1. Technical Field

This invention relates generally to a tire grinding and buffing apparatus, and more particularly, to a tire grinding machine having two pairs of grinding wheels in combination with a dust removal system. Specifically, the present invention relates to a tire grinding apparatus having two pairs of grinding wheels with the wheels of the pairs rotating in opposite directions while a dust collection system directs compressed air against the tire and then vacuums the dust away from the tire between the grinding wheels.

2. Background Information

Treating the outer surface of a tire by grinding or buffing is desired for various reasons in a tire manufacturing process. For instance, one of the final steps in the tire manufacturing process is to balance the tire by grinding rubber away from appropriate portions of the tire tread or shoulder. This removal allows the tire to be dynamically balanced. Buffing the tire surface may also be desirable in certain situations to provide a pleasing appearance to the tire to increase its aesthetics while on the showroom floor.

These grinding and buffing processes create large quantities of rubber dust. A substantial amount of this dust remains on the tire trapped in the tread grooves and in the sipes. The dust must be washed off the tire or shipped with the tire. The tire appears to be dirty when the dust is not removed and the dust falls onto the floor of the manufacturing facility. Dust also comes off on one's hands when the tire is handled or falls off onto the showroom floor during display. It is thus desired in the art to provide a dust removal system that acts in cooperation with a grinding apparatus to remove a substantial amount of the dust from the tire and especially from within the treads and sipes of the tire. In the prior art, brushes and vacuum systems have been used with some degree of success but room for improvement remains.

Tire grinders known in the art typically include a grinder wheel that quickly rotates against the outer surface of the tire while the tire rotates relatively slowly throughout a full rotation. When a buffing operation is desired after the grinding operation, the tire must be transferred to another station where the tire is buffed. These operations result in the creation of tire dust at two locations in the tire manufacturing facility. Buffing is desired when the grinding operation results in a relatively rough outer surface. It is thus desired in the art to provide an improved grinding apparatus that creates an improved tire surface as a result of the grinding process. It is also desired to provide an apparatus that grinds, buffs, and removes dust at a single station.

SUMMARY OF THE INVENTION

In view of the foregoing, it is an objective of the present invention to provide a tire grinding apparatus that combines the grinding and buffing steps in a single apparatus.

Another objective of the present invention is to provide a tire grinding apparatus that utilizes leading and trailing grinding wheels to first roughly grind the tire surface with the leading wheel and then buff or polish the tire surface with the trailing wheel.

Still another objective of the present invention is to provide a tire grinding apparatus that utilizes pairs of leading and railing grinding wheels that rotate in opposite directions.

Yet another objective of the present invention is to provide a tire grinding apparatus that removes the dust created by the grinding process and especially from the tire tread and tire sipes.

A further objective of the present invention is to provide a tire grinding apparatus that has pairs of grinding wheels mounted on adjustable supports such that the positions of the wheels can be adjusted with respect to the tire surface.

Yet a further objective of the present invention is to provide a tire grinding apparatus that has pairs of grinding wheels mounted on adjustable supports such that the orientation of one of the grinding wheels may be adjusted with respect to the other of the grinding wheels.

Still a further objective of the present invention is to provide a tire grinding apparatus that has a hood that at least partially covers the grinding wheels and assists in the removal of rubber dust from the tire.

Another objective of the present invention is to provide a tire grinding apparatus that utilizes a pair of cooperating systems for removing and gathering dust from the tire.

A further objective of the present invention is to provide a tire grinding apparatus that includes a compressed air system and a vacuum system that remove dust from the tire being ground.

Another objective of the present invention is to provide a tire grinding apparatus that utilizes a pair of grinding wheels with each of the grinding wheels rotating at different speeds to provide different surface finishes to the tire.

Another objective of the present invention is to provide a tire grinding apparatus having leading and trailing grinding wheels that have different grinding surfaces so that each wheel provides a different finish to the tire.

A further objective of the present invention is to provide a tire grinding apparatus that is of simple construction, which achieves the stated objectives in a simple, effective, and inexpensive manner, and which solves the problems and which satisfies the needs existing in the art.

These and other objectives and advantages are obtained by the dual tire grinding apparatus of the present invention, the general nature of which may be stated as including a support arm; a leading grinding wheel rotatably carried by the support arm, the leading grinding wheel being adapted to contact the tire being ground; a trailing grinding wheel rotatably carried by the support arm, the trailing grinding wheel adapted to contact the tire being ground behind the leading grinding wheel as the tire rotates with respect to the support arm; and means for rotating the grinding wheels.

Other objectives and advantages of the present invention are achieved by a tire grinding apparatus including a support arm; a grinding wheel rotatably carried by the support arm; a source of pressurized air; a blower head carried by the support arm adjacent the grinding wheel, the blower head in fluid communication with the source of pressurized air and adapted to direct pressurized air against the tire being ground; and means for rotating the grinding wheel.

Yet other objectives and advantages of the present invention are achieved by a method for grinding the outer surface of a tire including the steps of rotating a tire in a first rotational direction; rotating a leading grinding wheel in the opposite rotational direction as the tire; contacting the leading grinding wheel with the tire such that the contacting surfaces are moving in the same tangential direction; rotating a trailing grinding wheel in the same rotational direction as the tire; and contacting the trailing grinding wheel with the tire behind the leading grinding wheel such that the contacting surfaces are moving in opposite tangential directions.

BRIEF DESCRIPTION OF THE DRAWINGS

The preferred embodiment of the invention, illustrative of the best mode in which applicant contemplated applying the principles of the invention, is set forth in the following description and is shown in the drawings and is distinctly pointed out and set forth in the appended claims.

Similar numbers refer to similar elements throughout the specification.

DESCRIPTION OF THE PREFERRED EMBODIMENT

Figure 1:
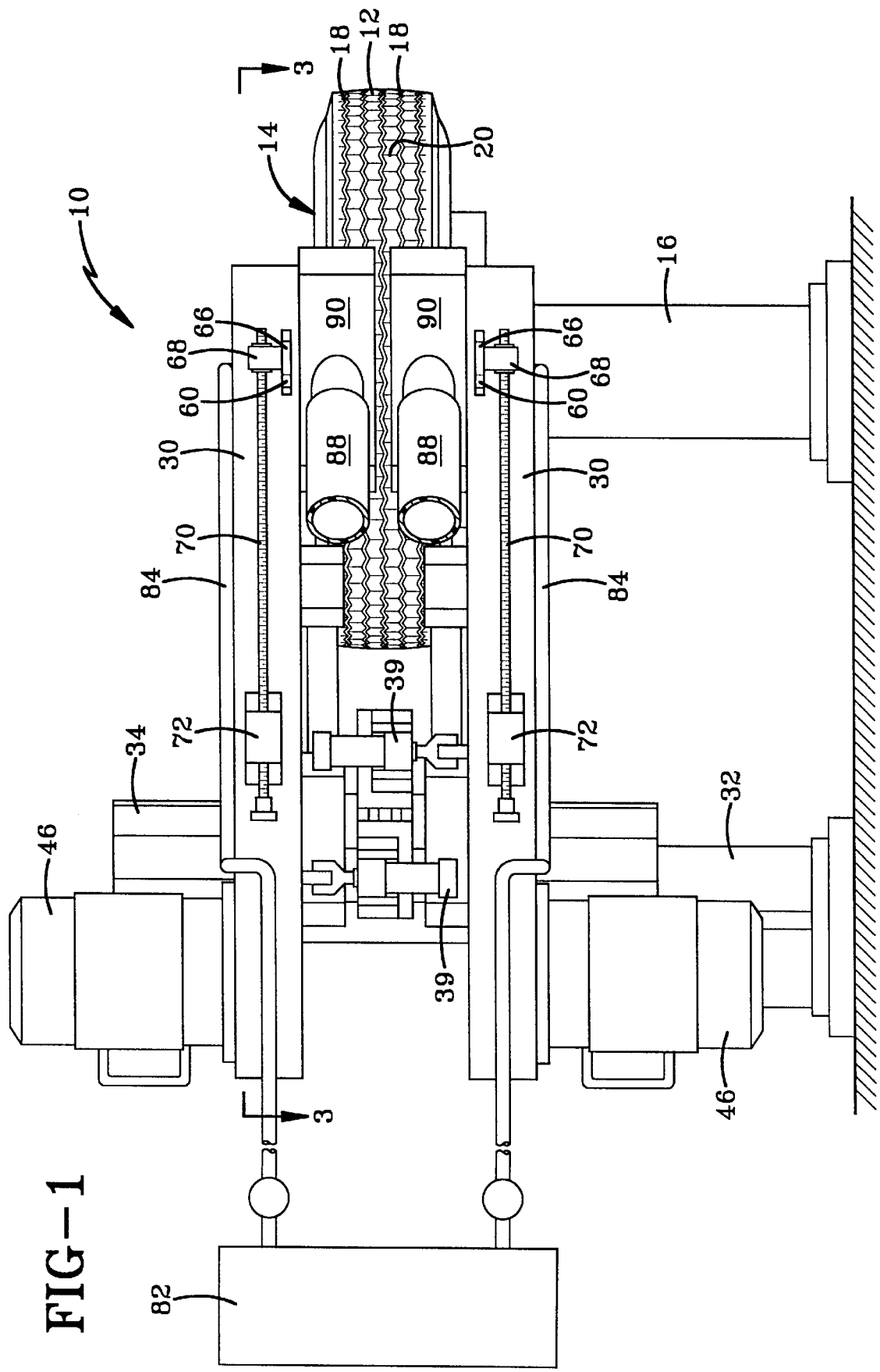
FIG. 1 is a diagrammatic side elevational view of the improved dual wheel tire grinder of the present invention with the vacuum hoses shown in section.
Figure 4:
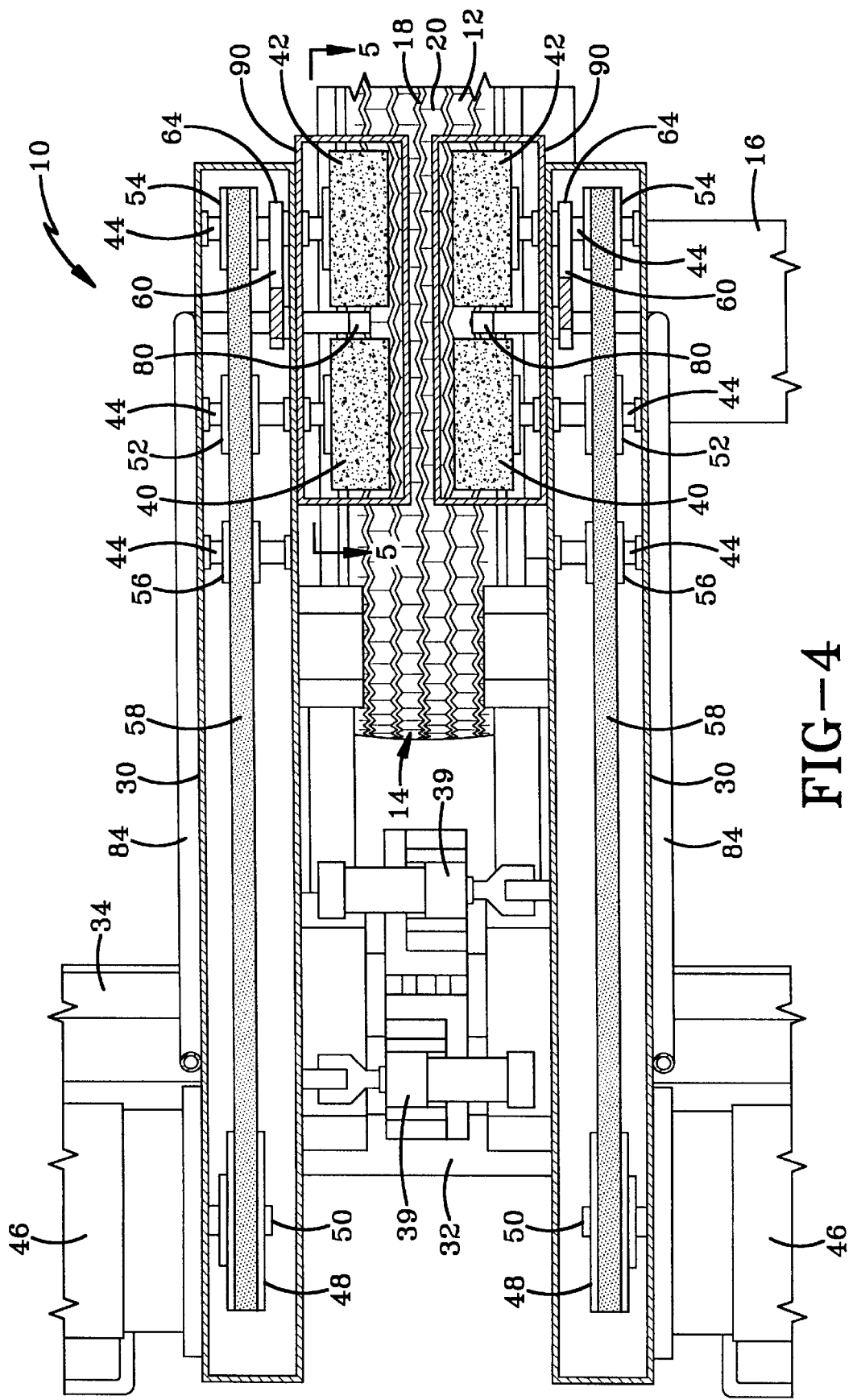
FIG. 4 is an enlarged fragmentary sectional view taken along line 4—4 of FIG. 2.
Figure 5:
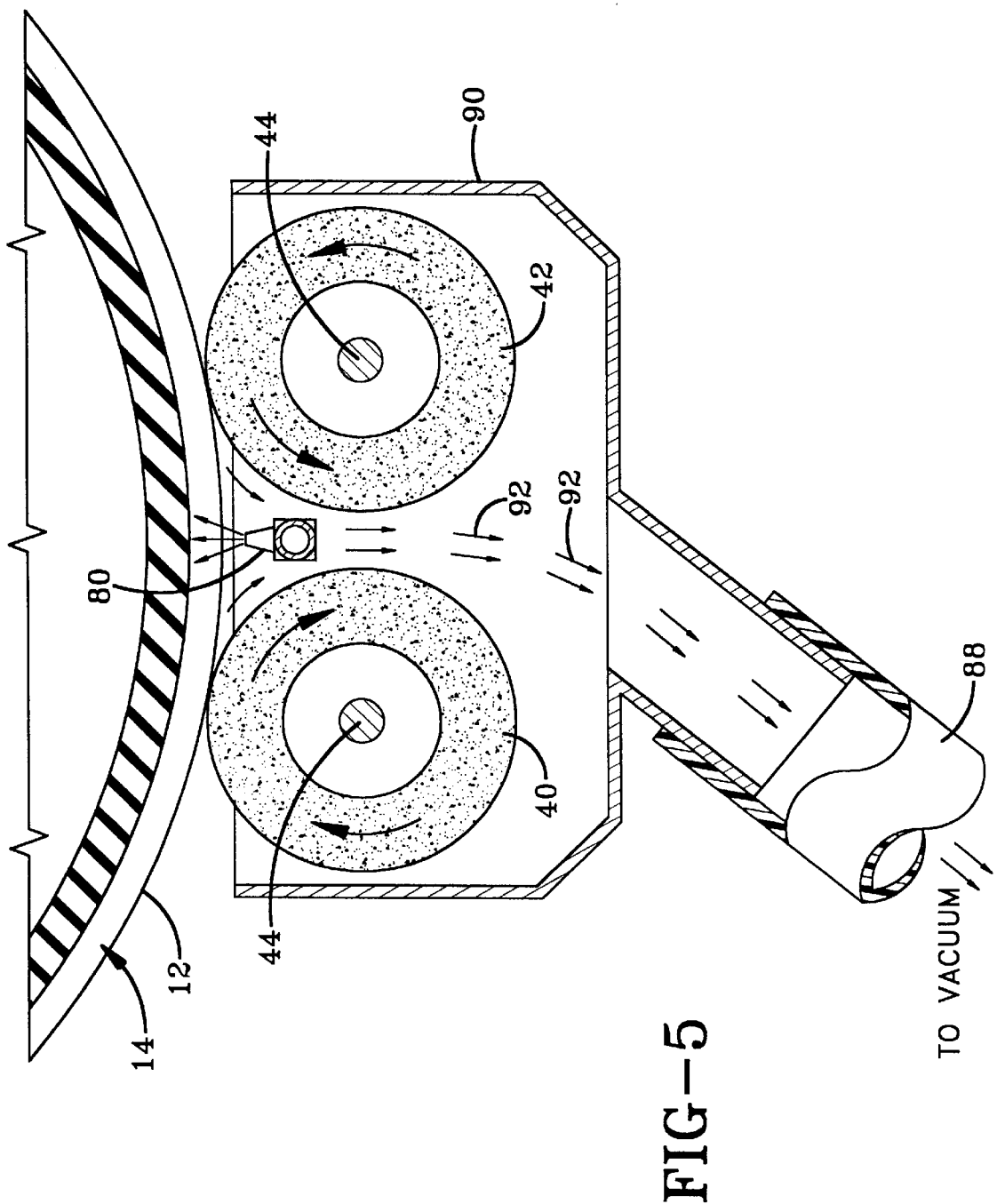
FIG. 5 is an enlarged fragmentary sectional view taken along line 5—5 of FIG. 4.

The dual wheel tire grinding apparatus of the present invention is indicated generally by the numeral 10 in the accompanying drawings. Tire grinding apparatus 10 is used to grind the outer surface 12 of a tire 14. Tire 14 is rotatably supported by an appropriate support 16 that may include means for rotating tire 14 about its rotational axis. Grinding is used to balance tire 14 prior to the sale of the tire. It is generally desired to grind the shoulder areas of tire 14 which include the outer portions of the outwardly facing tread. As may be seen in FIGS. 1 and 4, tire 14 includes major tread grooves 18 as well as a plurality of sipes 20 that are substantially smaller than tread grooves 18. Both tread grooves 18 and sipes 20 fill with rubber dust as a result of the grinding process and it is desired to remove this dust from the tread grooves and sipes.

Figure 2:
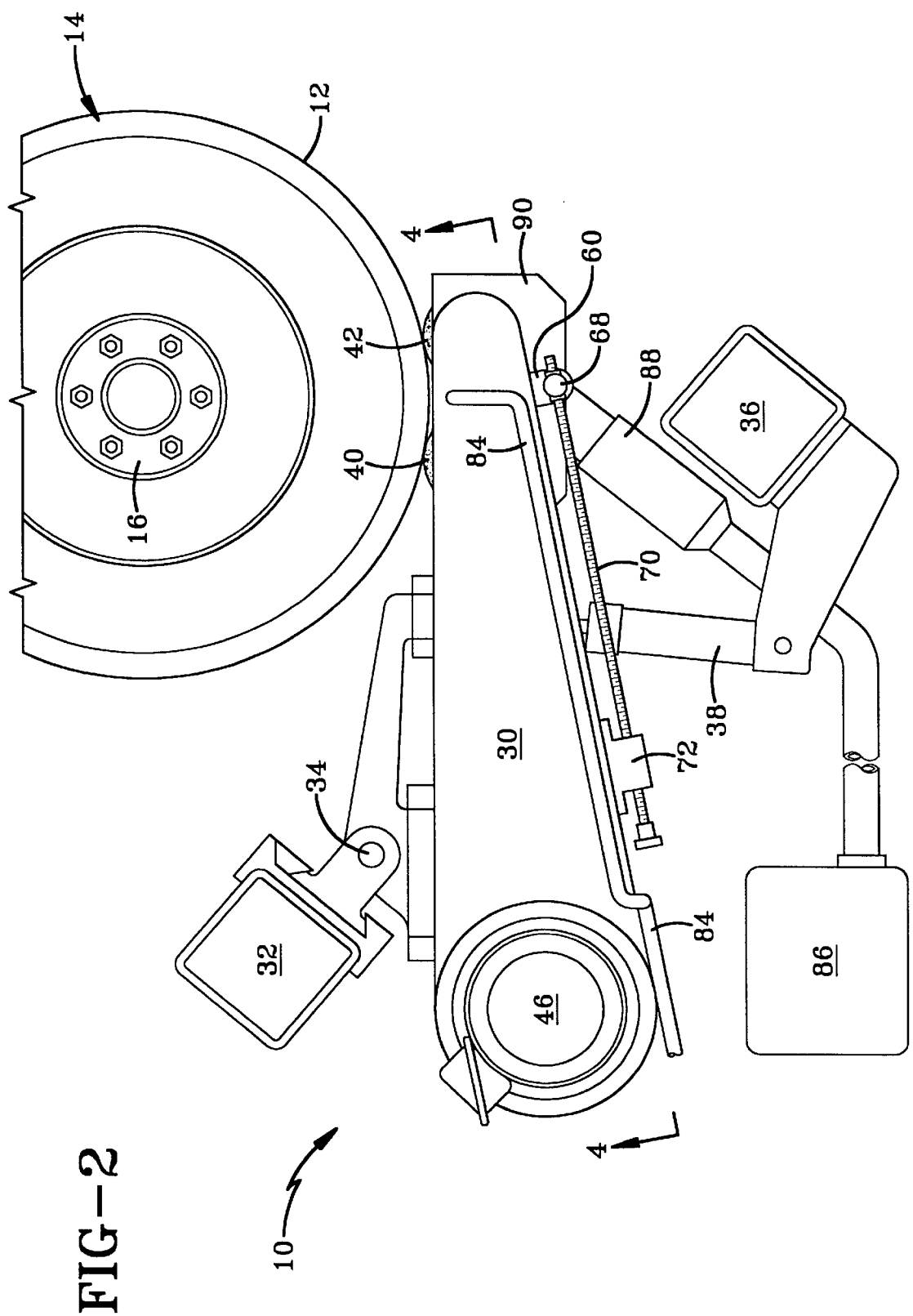
FIG. 2 is an enlarged fragmentary top plan view of the dual wheel tire grinding apparatus of FIG. 1.

Tire grinding apparatus 10 generally includes a pair of support arms 30, each pivotally carried by a fixed support 32 in opposed relation to each other. The position of each arm 30 with respect to tire 14 is adjustable about pivot 34. An appropriate device to adjust the position of support arm 30 is provided between a second fixed support 36 and support arm 30 as is seen in FIG. 2. In the preferred embodiment of the present invention, an expandable and retractable cylinder 38, extends between fixed support 36 and arm 30 such that extension of cylinder 38 drives arm 30 toward tire 14 and retraction cylinder 38 pulls arm 30 away from tire 14. In the preferred embodiment, cylinder 38 is a pneumatically operated cylinder but in other embodiments of the invention, a hydraulically operated cylinder may be used. In still other embodiments of the present invention, other linear actuators and devices known in the art may be employed for adjusting arm 30 about pivot 34.

Support arms 30 may also be adjusted with respect to each other using a pair of adjustment devices 39. Devices 39 extend between arms 30 and are selectively operable to change the angle between arms 30. Devices 39 may be any of a variety known in the art.

In accordance with one of the objectives of the present invention, grinding apparatus 10 includes a leading grinding wheel 40 and a trailing grinding wheel 42 carried by each support arm 30. Each grinding wheel 40 and 42 is rotatably carried by support arm 30 such that it may rotate freely with respect to support arm 30. Each grinding wheel 40 and 42 may be rotatably carried on an appropriate axle 44.

Figure 3:
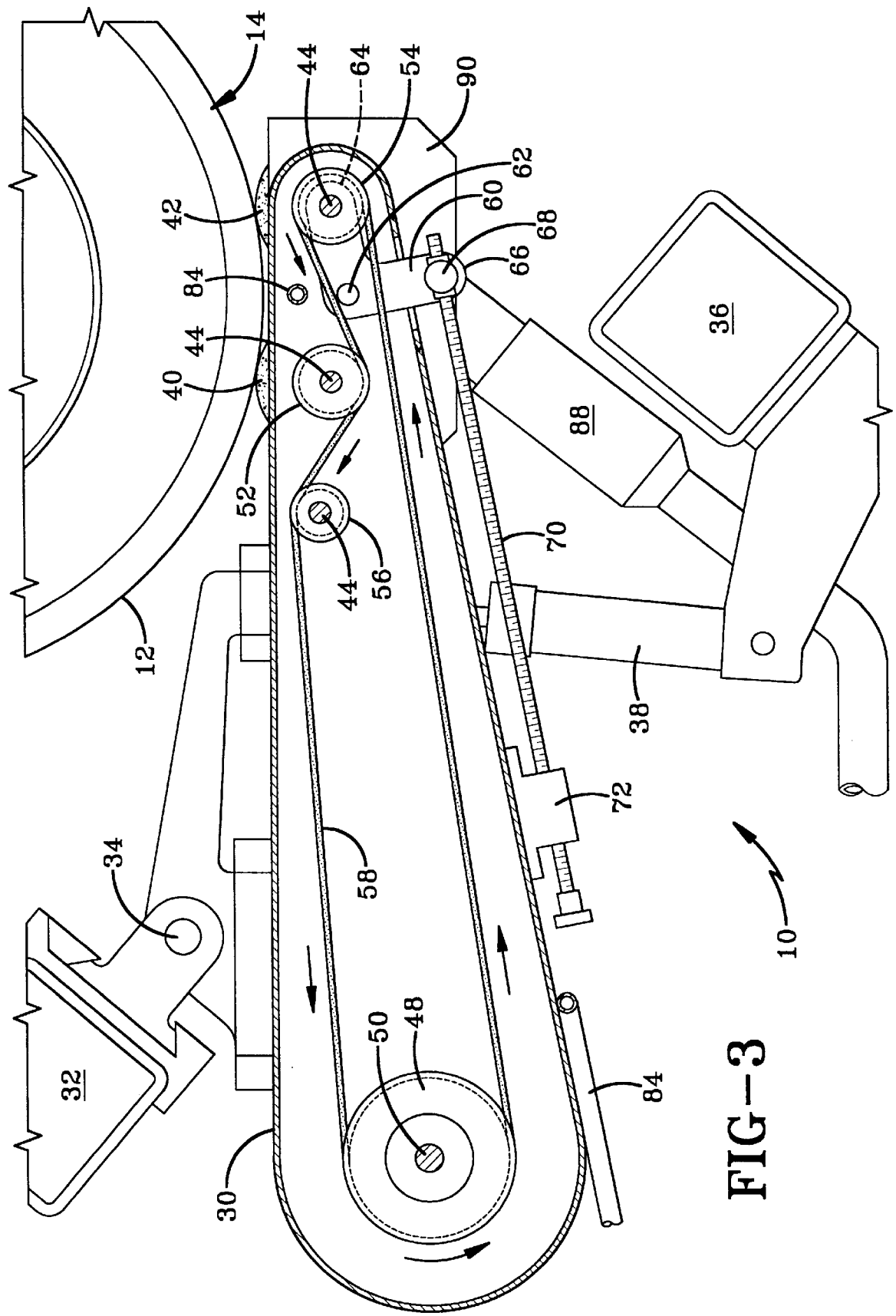
FIG. 3 is an enlarged fragmentary sectional view taken along line 3—3 of FIG. 1.

Grinding wheels 40 and 42 are driven by a motor 46 that is carried by support arm 30 at the end of arm 30 opposite from grinding wheels 40 and 42. A drive pulley 48 is connected to a drive shaft 50 of motor 46. A pulley 52 is connected to leading grinding wheel 40 by shaft 44 and a pulley 54 is connected to trailing grinding wheel 42 by another shaft 44. A reversing pulley 56 is rotatably carried by arm 30 on another shaft 44. Pulleys 48, 52, 54, and 56 are connected by a belt 58 that is seated in pulleys 48, 52, 54, and 56 and causes pulleys 52, 54, and 56 to rotate when drive pulley 48 is driven by motor 46. As is best seen in FIG. 3, counterclockwise rotation of belt 58 causes pulley 54 and trailing grinding wheel 42 to rotate in the counterclockwise direction while causing pulley 52 and leading grinding wheel 40 to rotate in the clockwise direction. Belt 58 then passes over pulley 56 and returns to drive pulley 48. Arm 30 is configured such that pulleys 48, 52, 54, and 56 as well as belt 58 are enclosed within arm 30 to provide a degree of safety to grinding apparatus 10. Other systems to drive grinding wheels 40 and 42 may be utilized with grinding apparatus 10 without departing from the concepts of the present invention. For instance, each grinding wheel 40 and 42 may be driven directly with an independent motor. In still other embodiments of the present invention, grinding wheels 40 and 42 may be driven with a motor and a series of gears. An advantage of belt 58 of the preferred embodiment of the present invention is that belt 58 allows for some slippage and accommodation of shock forces that are experienced by apparatus 10.

As discussed above, the position of the arm 30 with respect to tire 14 may be adjusted through selective activation of piston cylinder 38. Such adjustment of arm 30 also allows for adjustment of leading grinding wheel 40 with respect to tire 14. When other tires are used or different surface finishes are desired, it is also required that trailing grinding wheel 42 be adjustable with respect to leading grinding wheel 40. An adjustment arm 60 provides for such adjustment.

Adjustment arm 60 is pivotally carried by arm 30 at pivot 62. Adjustment arm 60 is L-shaped and includes a first end 64 and a second end 66. Pulley 54 and trailing grinding wheel 42 are carried on first end 64 of adjustment arm 60. A threaded nut 68 is pivotally carried by second end 66 of adjustment arm 60. A threaded rod 70 treadably engages nut 68 and extends along the length of arm 30. Threaded rod 70 threaddedly engages a block 72 that is carried by arm 30. Rotation of threaded rod 70 thus causes second end 66 of adjustment arm 60 to move with respect to block 72. As second end 66 is moved, trailing grinding wheel 42 is adjusted with respect to tire 14, support arm 30, and leading grinding wheel 40. The pitch of the threads on threaded rod 70 allows the adjustment of trailing grinding wheel 42 to be precise.

In accordance with another objective the present invention, a blower head 80 is positioned adjacent grinding wheels 40 and 42 and may be positioned directly between grinding wheels 40 and 42. Blower head 80 is in selective fluid communication with a source of pressurized air 82 by a supply line 84. Supply line may be disposed outside support arm 30 as to not interfere with operation of belt 58. Blower head 80 is adapted to direct pressurized air against surface 12 of tire 14 to blow dust out of tread grooves 18 and sipes 20.

A vacuum system is also employed in cooperation with grinding apparatus 10 to remove dust created by grinding wheels 40 and 42 and dislodged by blower head 80. The vacuum system includes a vacuum source 86 and vacuum tubes 88 that direct the vacuum flow created by vacuum source 86 adjacent tire surface 12 around grinding wheels 40 and 42. The vacuum system may include appropriate filters such that the dust gathered by the vacuum system does not harm vacuum source 86.

A hood 90 is carried by support 30 and substantially surrounds grinding wheels 40 and 42. The interior of hood 90 is in fluid communication with vacuum source 86 such that hood 90 functions as a nozzle for vacuum tubes 88. Blower head 80 is also at least partially disposed within hood 90. Hood 90 thus functions to catch a large percentage of the dust removed from tire 14 and directs it into the vacuum system. The rotation of grinding wheels 40 and 42 assists in the dust collection by throwing the dust into a channel between wheels 40 and 42 where the vacuum system readily removes the dust as depicted by the arrows labeled with numeral 92.

Tire grinding apparatus 10 is used to grind and buff the surface 12 of tire 14. Tire 14 is supported on the appropriate support 16 at the location of tire grinding apparatus 10. Cylinder 38 is then used to position arm 30 and leading grinding wheel 40 in the appropriate position for grinding wheel 40 to contact surface 12 of tire 14. Trailing grinding wheel 42 is then positioned with threaded rod 70 such that the grind provided by trailing grinding wheel 42 is a fine or buffing grind resulting in a pleasing aesthetic appearance and desirable surface finish for tire 14. Such rough grinding and fine buffing or polishing accomplishes one of the objectives of the present invention. It is also contemplated that the surfaces of wheels 40 and 42 may be varied to provide the desired surface finish. After wheels 40 and 42 are positioned, tire 14 is rotated and drive motors 46 are activated causing belt 58 to rotate and drive grinding wheels 40 and 42 against tire 14.

When motors 46 are started, vacuum source 86 is also initiated as well as air pressure source 82. Vacuum source 86 draws a vacuum and creates a vacuum flow from hood 90 while source of air pressure 82 directs pressurized air to blower head 80 where it is directed against surface 12 of tire 14. The pressurized air clears dust from tread grooves 18 and sipes 20 where it is directed through grinding wheels 40 and 42 into vacuum hoses 88.

The amount and quality of the grind delivered by grinding wheels 40 and 42 may be adjusted by adjusting the grit or roughness of grinding wheels 40 and 42. The quality of the grind may also be adjusted by altering the speed at which wheels 40 and 42 rotate. The rotational speeds of grinding wheels 40 and 42 may be adjusted by changing the diameters of pulleys 52 and 54. In some situations, it may be desirable to cause trailing grinding wheel 42 to rotate faster than leading grinding wheel 40. In yet other situations, it may be desirable to have leading grinding wheel 40 rotating than trailing grinding wheel 42. Such rotational speeds depend on the type of tire 14 being ground and the type of grind desired.

Accordingly, the improved tire grinding apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved tire grinding apparatus is constructed and used, the characteristics of the construction, and the advantageous new and useful results obtained; the new and useful structures, devices, elements, arrangements, parts, and combinations are set forth in the appended claims.

What is claimed is:

1. A tire grinding apparatus for grinding the surface of a rotating tire, said apparatus comprising:

a support arm;

a leading grinding wheel rotatably carried by said support arm, said leading grinding wheel adapted to contact the tire;

a trailing grinding wheel rotatably carried by said support arm, said trailing grinding wheel adapted to contact the tire behind said leading grinding wheel as the tire rotates with respect to said support arm; and means for rotating said grinding wheels;

each of said grinding wheels having a rotational axis, said rotational axes of said grinding wheels being substantially parallel to each other;

said rotational axes being substantially parallel to the rotational axis of the tire;

said means for rotating causing said leading grinding wheel to rotate in an opposite direction from said trailing grinding wheel;

said leading and trailing grinding wheels having a roughness, said roughness of said leading grinding wheel being different than said roughness of said trailing grinding wheel.

2. A tire grinding apparatus according to claim 1, further comprising a base, said support arm on said base, an extendable and retractable piston cylinder connected to said base and said support arm, and pivot means for pivotally mounting said support arm on said base.

3. A tire grinding apparatus according to claim 1, further comprising a source of compressed air and a blower head adapted to direct pressurized air from said source of compressed air against the tire.

4. A tire grinding apparatus according to claim 3, further comprising a vacuum source and at least one vacuum hose that directs a vacuum flow created by the vacuum source adjacent to said grinding wheels.

5. A tire grinding apparatus according to claim 4, wherein said blower head is disposed between said grinding wheels.

6. A tire grinding apparatus according to claim 4, further comprising a hood carried by said support arm, said hood at least partially surrounding said grinding wheels and said blower head, said vacuum hose being in fluid communication with the interior of said hood.

7. A tire grinding apparatus according to claim 1, further comprising:

a second support arm disposed adjacent to said support arm;

a second leading grinding wheel rotatably carried by said second support arm, said second leading grinding wheel adapted to contact the other side of the tire than said leading grinding wheel;

a second trailing grinding wheel rotatably carried by said second support arm, said second trailing grinding wheel adapted to contact the tire behind said second leading grinding wheel as the tire rotates with respect to said second support arm; and means for rotating each of said second grinding wheels.

8. A tire grinding apparatus according to claim 7, further comprising means for adjusting the position of said second support arm with respect to said support arm.

9. A tire grinding apparatus for grinding the surface of a rotating tire, said apparatus comprising:

a support arm;

a leading grinding wheel rotatable carried by said support arm, said leading grinding wheel adapted to contact the tire;

a trailing grinding wheel rotatably carried by said support arm, said trailing grinding wheel adapted to contact the tire behind said leading grinding wheel as the tire rotates with respect to said support arm; and means for rotating said grinding wheels;

said means for rotating causes one of said grinding wheels to rotate at a different rotational speed than the other of said grinding wheels.

10. A tire grinding apparatus according to claim 9, wherein each of said grinding wheels has a grinding surface having a roughness, said roughness of said leading grinding wheel being different than said roughness of said trailing grinding wheel.

11. A tire grinding apparatus for grinding the surface of a rotating tire, said apparatus comprising:

a support arm;

a leading grinding wheel rotatably carried by said support arm, said leading grinding wheel adapted to contact the tire;

a trailing grinding wheel rotatably carried by said support arm, said trailing grinding wheel adapted to contact the tire behind said leading grinding wheel as the tire rotates with respect to said support arm; and means for rotating said grinding wheels;

said means for rotating causing said leading grinding wheel to rotate in an opposite direction from said trailing grinding wheel;

said means for rotating including a drive motor and a belt, said belt being operatively connected to said drive motor and to each of said grinding wheels; and a first pulley connected to said leading grinding wheel, a second pulley connected to said trailing grinding wheel, and a drive pulley connected to said drive motor, said belt being seated in said first, second, and drive pulleys.

12. A tire grinding apparatus according to claim 11 further comprising a reversing pulley carried by said support arm, said belt being seated in said reversing pulley.

13. A tire grinding apparatus for grinding the surface of a rotating tire, said apparatus comprising:

a support arm;

a leading grinding wheel rotatably carried by said support arm, said leading grinding wheel adapted to contact the tire;

a trailing grinding wheel rotatably carried by said support arm, said trailing grinding wheel adapted to contact the tire behind said leading grinding wheel as the tire rotates with respect to said support arm; and means for rotating said grinding wheels;

said means for rotating causing said leading grinding wheel to rotate in an opposite direction from said trailing grinding wheel;

an adjustment bracket having a first end and second end;

said adjustment bracket pivotally carried by said support arm;

one of said grinding wheels being rotatably carried by said first end of said adjustment bracket; and means for selectively moving said adjustment bracket; said means for selectively moving being connected to said second end of said adjustment bracket.

14. A tire grinding apparatus according to claim 13, wherein said means for selectively moving includes a threaded rod, a nut pivotally connected to said second end of said adjustment arm, and a threaded block carried by said support arm, said threaded rod threadedly engaging said block and said nut such that rotation of said threaded rod moves said nut and said second end of said adjustment arm with respect to said block.

15. A tire grinding apparatus according to claim 14, wherein said adjustment bracket is L-shaped and has an elbow with said elbow being pivotally connected to said support arm.

16. A tire grinding apparatus for grinding the surface of a rotating tire, said apparatus comprising:

a support arm;

a first grinding wheel rotatably carried by said support arm;

a second grinding wheel rotatably carried by said support arm; said second grinding wheel being spaced from said first grinding wheel to form a space between the grinding wheels;

a hood carried by said support arm;

said grinding wheels at least partially surrounded by said hood;

a source of pressurized air;

a blower head carried by said support arm between said grinding wheels, said blower head in fluid communication with said source of pressurized air and adapted to direct pressurized air against the tire;

means for creating a vacuum flow and directing said vacuum flow adjacent said grinding wheels in said hood; and means for rotating said grinding wheels; said means for rotating being adapted to rotate said grinding wheels to direct particles removed from the tire to the space between the grinding wheels.

* * * * *